Jan. 28, 1958 J. J. MIKOS ET AL 2,821,606
CIRCUIT INTERRUPTER
Filed Sept. 23, 1953 4 Sheets-Sheet 1

WITNESSES:
Robert C Baird
W. R. Crout

INVENTORS
John J. Mikos &
Charles E. Moss.
BY
Ralph H. Swingle
ATTORNEY

Jan. 28, 1958  J. J. MIKOS ET AL  2,821,606
CIRCUIT INTERRUPTER

Filed Sept. 23, 1953  4 Sheets-Sheet 2

WITNESSES:
Robert C Baird
W. R. Crout

INVENTORS
John J. Mikos &
Charles E. Moss.
BY
Ralph H. Swingle
ATTORNEY

Jan. 28, 1958    J. J. MIKOS ET AL    2,821,606
CIRCUIT INTERRUPTER

Filed Sept. 23, 1953    4 Sheets-Sheet 3

WITNESSES:
Robert C. Baird
W. R. Crout

INVENTORS
John J. Mikos &
Charles E. Moss.
BY Ralph D. Swingle
ATTORNEY

Jan. 28, 1958 J. J. MIKOS ET AL 2,821,606
CIRCUIT INTERRUPTER
Filed Sept. 23, 1953 4 Sheets-Sheet 4

WITNESSES:
Robert C. Baird
W. R. Crout

INVENTORS
John J. Mikos &
Charles E. Moss.
BY
Ralph H. Swingle
ATTORNEY

United States Patent Office 2,821,606
Patented Jan. 28, 1958

2,821,606

CIRCUIT INTERRUPTER

John J. Mikos, Chicago, Ill., and Charles E. Moss, Pittsburgh, Pa., assignors to Westinghouse Electric Corporation, East Pittsburgh, Pa., a corporation of Pennsylvania Application September 23, 1953, Serial No. 381,836

9 Claims. (Cl. 200—147)

This invention relates to circuit interrupters in general, and, more particularly, to arc-extinguishing structures therefore, such as are used advantageously for interrupting direct currents.

A general object of our invention is to provide an improved and more effective arc-extinguishing structure for a circuit interrupter in which improved interrupting performance is obtained over the entire range of currents which the interrupter is rated to handle.

A more specific object is to provide an improved contact arrangement in which the terminal end of an arc is facilitated in its outward travel along the contact.

Still a further object is to provide an improved center-coil type of circuit interrupter, in which the transfer arc horns are configured to improve the operation of the interrupter, particularly during the interruption of low-current values.

Still another object is to improve the transfer of the blowout coil into series circuit by facilitating outward travel of the main arc, and promoting ready transfer of an intermediate portion of the main arc into contact with the transfer arc horns.

Further objects and advantages will readily become apparent upon reading the following specification, taken in conjunction with the drawings, in which.

Figure 1:
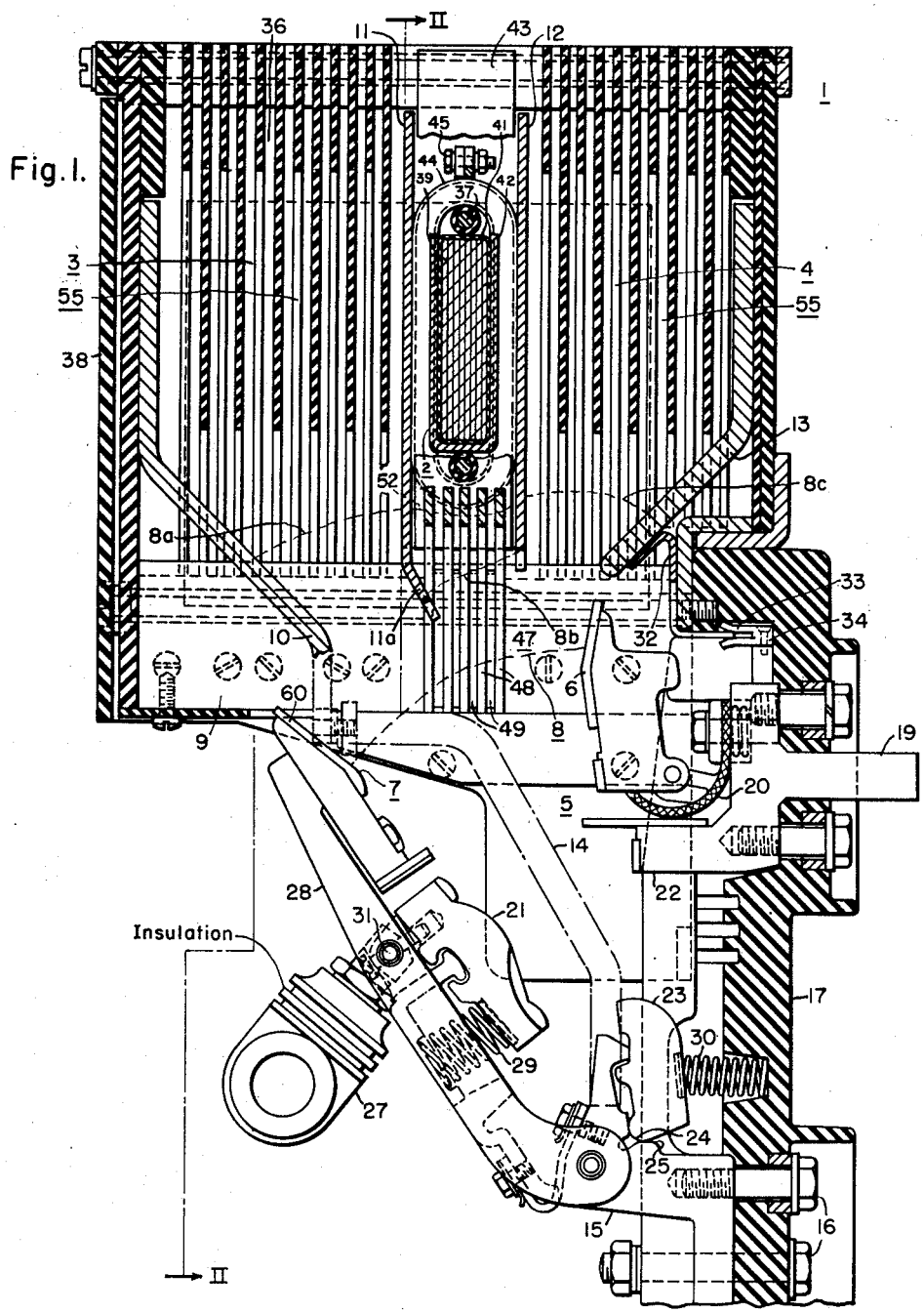
Figure 1 is a side elevational view of a circuit interrupter embodying the features of our invention, with the arc chute and the base structure shown in substantially vertical section, the contact structure being illustrated in the fully open-circuit position.

Referring to the drawings, and more particularly to Fig. 1 thereof, the reference numeral 1 generally designates a circuit interrupter of the center-coil type, in which a center-coil blowout assembly 2 is disposed between a pair of arc-extinguishing sections 3, 4. An arc is established at the contact structure, generally designated by the reference numeral 5, and is moved upwardly and outwardly along a relatively stationary arcing contact 6 and a movable arcing contact 7.

The main arc, generally designated by the reference numeral 8, is moved upwardly and outwardly, because of the magnetic loop effect of the circuit connections, as well known by those skilled in the art, and also because of convection currents caused by heating by the main arc, into contact with a front arc horn 10, a front transfer arc horn 11, a rear transfer arc horn 12 and a rear arc horn 13.

As indicated in Fig. 1, the front arc horn 10 is connected by a strap connection 14 to a conducting hinge 15, which is bolted, by one or more bolts 16, to a base structure 17. The base structure 17 may be mounted vertically, horizontally or in any other position as operating requirements may dictate. The base structure 17 is formed, in this particular instance, by molding a suitable moldable insulating material to the desired configuration, as well understood by those skilled in the art. It could, however, be machined out of insulating material or cast out of porcelain. The lower terminal stud for the interrupter, not shown, is electrically connected to the lower conducting hinge 15 and the upper terminal stud 19 is electrically connected by flexible connectors 20 to the relatively stationary arcing contact 6.

In the fully closed-circuit position of the interrupter, a bridging contact 21 makes engagement with a main contact 22, which may be an integral extension of the conducting stud 19, to which the upper line terminal is affixed. The lower end of the main bridging contact 21 makes contact, in the closed-circuit position, with an auxiliary contact 23, the lower end of which makes contact, as at 24, to a portion 25 of the lower conducting hinge 15. An insulating operating rod 27, actuated by any suitable mechanism, not shown, is utilized to effect rotative opening and closing travel of a movable contact arm 28, to which the main bridging contact 21 and the movable arcing contact 7 are secured. As indicated, the main bridging contact 21 is biased by a spring 29 relative to the movable contact arm 28, and the auxiliary contact 23 is biased by a spring 30 away from the base 17 and into engagement with the conducting hinge 15. The operating rod 27 is pivotally connected to the movable contact arm by a pivot pin 31.

During the opening operation, the operating rod 27 is moved toward the left, and, by means of its pivotal connection 31 with the rotatable contact arm 28, causes separation between the bridging contact 21 and the main contact 22. During this time the arcing contacts 6, 7 remain in engagement.

Figure 6:
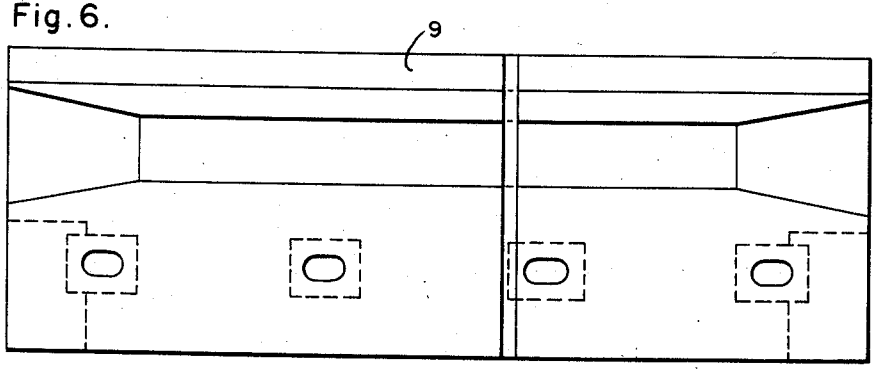
Figs. 6 and 7 are side elevational and end views respectively of an arc shield employed in the circuit interrupter of our invention.
Figure 7:
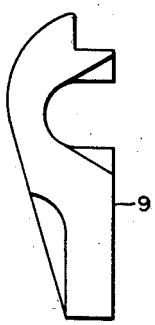

Subsequently, the flexibly mounted relatively stationary arcing contact 6 reaches the limit of its outward movement, and the movable arcing contact 7 separates away therefrom to establish the main arc 8, as heretofore mentioned. The arc 8 is moved upwardly between a pair of arc shields 9, showed more clearly in Figs. 6 and 7. The main arc 8, in moving upwardly, separates into 3 portions 8a and 8b and 8c. The rear arc horn 13 is brazed, or otherwise secured, to a conducting strap 32, which is electrically connected to clips 33, secured by screws 34 to a top portion of the terminal stud 19.

To speed up the upward travel of the established arcs 8a, and 8c, a blowout coil assembly 2, as previously mentioned, is provided. The blowout coil assembly includes a pair of side pole plates 36, formed of a plurality of thin magnetic laminations riveted together, and having a pair of mounting bolts 37 extending there through to clamp them on opposite sides of a rectangularly-shaped insulating arc chute jacket, designated by the reference character 38.

Figure 2:
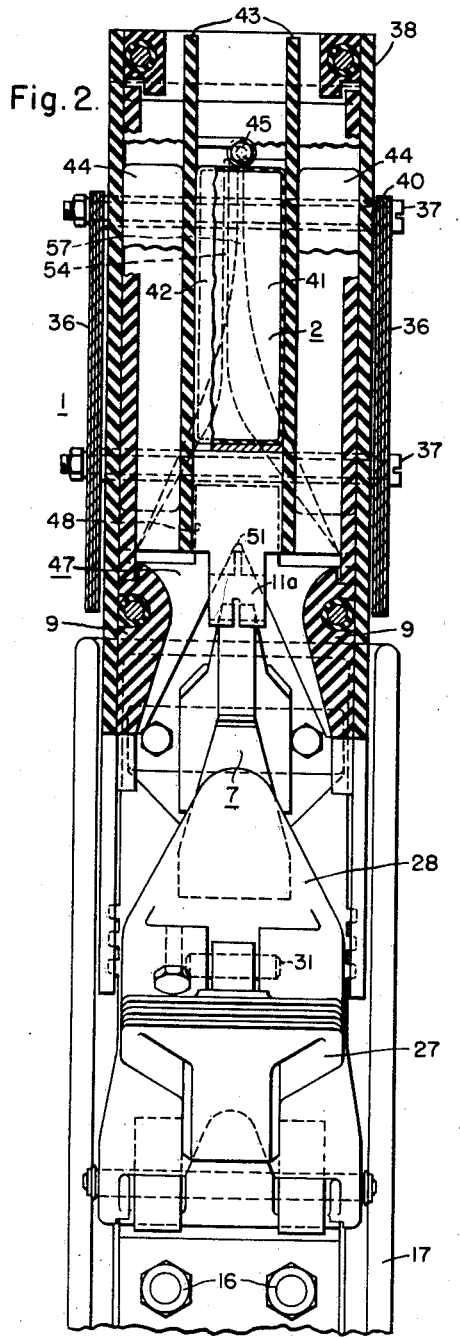
Fig. 2 is a broken vertical sectional view taken substantially along the line II—II of Fig. 1.

Magnetically interconnecting the side pole plates 36 is a centrally disposed rectangularly-shaped core, or yoke 39, more clearly shown in Fig. 1 of the drawings. Again the core 39 includes a plurality of vertically disposed laminations or magnetic material riveted together and extending through openings 40 provided in the side walls of the arc chute jacket 38, so as to abut the magnetic side pole plates 36. Wrapped about the yoke 39 is a fish-paper wrapping or insulating cover 41 which is encircled by a U-shaped magnetic spacer 42, which is positioned between a pair of vertically extending apertured insulating shield plates 43, the configuration of which is more clearly shown in Figs. 1 and 2 of the drawings.

Between each insulating shield plate 43 and the adjacent side wall of the arc-chute jacket 38 is a blowout coil, designated by the reference numeral 44, and encircling the core 39. The upper terminals of both coils 44 are connected together by a bolt 45, as shown more clearly in Fig. 1. The lower terminals of the coils 44 are connected to the transfer arc horns 11 and 12. Thus the two coils 44 are in series electrically, and the blowout coil, as a whole, is electrically connected between the transfer arc horns 11 and 12.

When the arc portion 8b engages the transfer arc horns 11, 12 it is desirable to effect extinction of the arc portion 8b, so as to compel the current to flow through the two serially related blowout coils 44. Because of the counter-voltage set up in the blowout coils 44, due to the inductance therein, it is difficult to extinguish the arc portion 8b, and for this reason a transfer arc-extinguishing means 47 is provided. The transfer arc-extinguishing means 47 is more clearly shown in Figs. 1 and 5 of the drawings.

Figure 5:
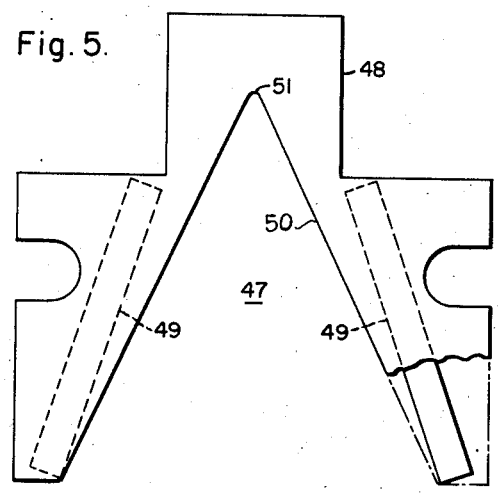
Fig. 5 is an enlarged end view of the improved transfer arc-extinguishing means of our invention.

As indicated in Fig. 5, the transfer arc-extinguishing means 47 includes a plurality of slotted steel plates 48 of the configuration indicated in Fig. 5, and spaced apart by asbestos strips 49. The magnetic plates 48 have slots 50 provided therein. The arc portion 8b is attracted upwardly within the slots 50 of the magnetic plates 48 to the apices 51 thereof, where it may move across the plates 48 in the form of serially related arc portions 52 until extinction ensues. Following extinction of the arcs 52, the blowout coils 44 are in series circuit, and they serve to set up magnetic flux within the magnetic circuit and transversely across the arc-extinguishing sections 3, 4.

Figure 3:
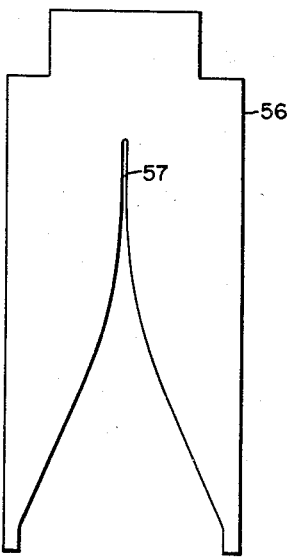
Figs. 3 and 4 are side elevational views of plate details utilized in the improved interrupter of our invention.
Figure 4:
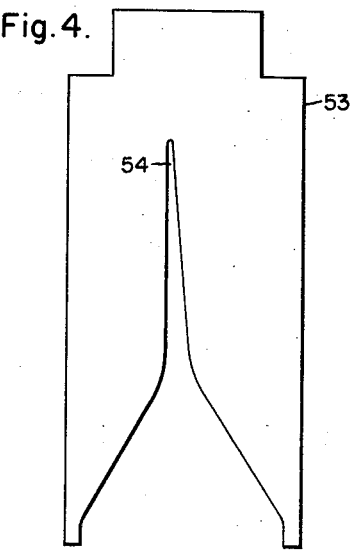

Each arc-extinguishing section 3, 4 comprises a plurality of insulating slotted plates 53, the slots 54 of which are disposed slightly off-center, and the plates are assembled alternately to provide a somewhat zigzag arc passage, generally designated by the refence numeral 55 in Fig. 1. The plate nearest the transfer arc horns 11, 12 is of the type set out in Fig. 3, and is designated by the reference numeral 56. This plate has a centrally disposed slot 57 on center to align the inner terminals of the arcs 8a, 8c centrally with respect to the transfer arc horns 11, 12.

The arc portions 8a, 8c in moving upwardly within the arc-extinguishing sections 3, 4 are compelled to assume a zigzag configuration as they move upwardly within the slots 54, 57 in the plates 53, 56 respectively. Cooling occurs, and the arcs 8a and 8c are quickly interrupted.

In a center-coil arc chamber, such as that illustrated in Fig. 1, the front center arc horn 11 and the rear center arc horn 12 are usually the same length and extend along the side of the transfer stack 47 the same amount. We have found that such a design is a very poor low-current interrupting device, as proven by tests. We have discovered that the rear center arc horn 12 had to be shortened, so that the low-current arc would not maintain itself between the rear arc horn 13, the rear center transfer arc horn 12 and the moving arcing tip 7 of the interrupter. Such a condition would not permit the transfer into series circuit of the blowout coils 44, and the result would be a failure to interrupt the low current.

In order to insert the blowout coils 44 into the circuit positively, the extension of the front center transfer arc horn 11 had to be lowered until mechanical clearance between the extension and the moving arc tip 7 on the breaker was the limiting factor. Then, this extension of the front center transfer arc horn 11 had to be bent toward the stationary arcing tip 6, as indicated by the reference character 11a, so that the blowout coils 44 would be inserted into the arcing circuit just as soon as the arc reached the end of the moving arcing tip 7. The extension 11a had to be situated so it would not interfere with the proper operation of the transfer stack 47, and so that it would not be demolished by high currents. Many tests have shown that this construction has adequate thermal capacity and produces fast extinction of low-current arcs as soon as these arcs reach the end of the moving arcing tip 7.

Figure 10:
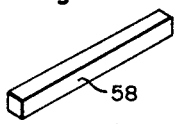
Fig. 10 is a perspective view of one of the magnetic inserts utilized in the movable arcing contact of our invention.
Figure 11:
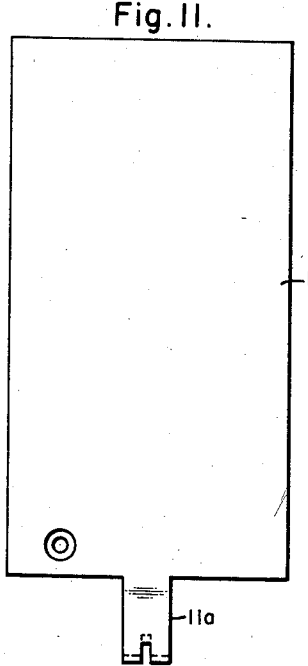
Figs. 11 and 12 are side elevational and end views respectively of the front transfer arc horn of our invention.
Figure 12:
Figure 13:
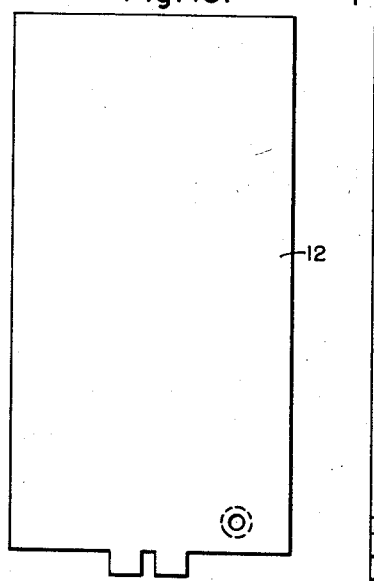
Figs. 13 and 14 are side elevational and end views of the rear transfer arc horn of the circuit interrupter illustrated in Fig. 1.
Figure 14:

We have also discovered that arcing chambers in general can interrupt low-currents successfully only if the arc has reached the end of the moving arc tip. This is particularly true in arc chambers of the center-coil type, such as illustrated in Fig. 1. The blowout coils 44 will come into action only after the arc current is transferred into the blowout coils 44. It has been found by tests that the magnetic action of low-current arcs, as they move along the arc tips is very small, so small in fact that any deformations in the arc-tip surface may stop the upward motion of the arc. To induce the arc terminal to run up to the end of the moving arc tip 7, we have provided means so that this action would take place on low-current arcs as soon as they are established. Such a means is shown in Fig. 10 of the drawings, and consists of a plurality of magnetic bars 58 imbedded in the rear of the arcing tip 7 in a substantially V-shape, as shown. It will be observed that the top of the V is approximately even with the top of the moving arcing tip 7. The resulting magnetic action plus the effect of the V-shape causes the arc 8 to move up toward the top of the moving arcing tip 7. This upward arc movement occurs whether the arc tip surface is smooth or has deformations, and therefore, the arc-interrupting ability of the breaker and associated arc chambers is greatly improved. We have conducted tests which conclusively demonstrate that this V-shaped arc guider is the difference between interrupting failures and satisfactory performance in the low-current interrupting range.

Figure 8:
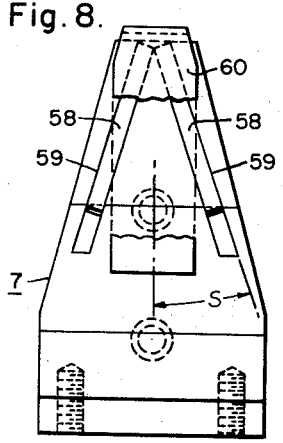
Figs. 8 and 9 are front and side elevational views, partly in section, of the improved movable arcing contact of our invention.
Figure 9:
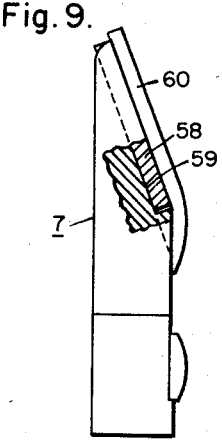

Referring to Figs. 8–10, it will be observed that slots 59 are milled out of the surface of the movable contact, formed of nonmagnetic material, such as copper or Phosphor-bronze. Then the magnetic or steel bars 58 are placed within the slots 59 so that each bar 58 makes approximately 17 degrees with the vertical, as indicated by the arrow S in Fig. 8. Following this operation, an arc-resisting contact portion 60 preferably overlies the bars 58, so that the terminal end of the arc 8 will not actually contact the magnetic bars 58. The arc-resisting tip portion 60 may be of any suitable arc-resisting material, such as a silver-tungsten alloy.

From the foregoing description of our invention it will be apparent that we have provided a novel combination of structural parts, which cooperate together to provide increased rapidity in arc movement so that not only does the terminal end of the arc 8 move quickly across the arc-resisting surface 60 of the arcing contact 7, as expedited by the presence of the bars 58, but also the disposition and configuration of the front transfer arc horn 11 and its extension 11a cooperate together to provide extremely fast insertion of the blowout coils 44 into series circuit. The result is quick movement of the arc portions 8a, 8c into the extinguishing sections 3, 4 for speedy interruption therein. The result is fast interruption of the electrical circuit associated with the interrupter 1.

Although we have shown and described a specific structure, it is to be clearly understood that the same was merely for the purpose of illustration, and that changes and modifications may readily be made therein by those skilled in the art without departing from the spirit and scope of the invention.

We claim as our invention:

1. A circuit interrupter including a pair of contacts cooperable to establish an arc therebetween, at least one of the contacts having a pair of magnetic bars disposed in a generally V-shape adjacent the contact surface to assist arc terminal movement along said one contact, and the plane containing said magnetic bars being substantially parallel to said contact surface.

2. A circuit interrupter including a pair of contacts cooperable to establish an arc therebetween, at least one of the contacts being composed of a non-magnetic material having a pair of magnetic bars disposed in a generally V-shape adjacent the contact surface to assist arc terminal movement along said one contact, and the plane containing said magnetic bars being substantially parallel to said contact surface.

3. A circuit interrupter including a pair of arc-extinguishing sections and a floating blowout coil assembly disposed therebetween, a movable contact separable from a relatively stationary contact to establish an arc, a pair of transfer arc horns connected to the ends of the blowout coil, and the transfer arc horn farthest from the stationary contact being extended to just mechanically clear the path of motion of the movable contact.

4. A circuit interrupter including a pair of arc-extinguishing sections and a floating blowout coil assembly disposed therebetween, a movable contact separable from a relatively stationary contact to establish an arc, a pair of transfer arc horns connected to the ends of the blowout coil, the transfer arc horn farthest from the stationary contact being extended to just mechanically clear the path of motion of the movable contact, and the moving contact having a pair of magnetic bars inclined toward each other in the direction of movement of the arc.

5. A circuit interrupter including a pair of arc-extinguishing sections and a floating blowout coil assembly disposed therebetween, a movable contact separable from a relatively stationary contact to establish an arc, a pair of transfer arc horns connected to the ends of the blowout coil, the transfer arc horn farthest from the stationary contact being extended to just mechanically clear the path of motion of the movable contact and extending downwardly toward the movable contact farther than the other transfer arc horn.

6. The combination in a circuit interrupter of the center-coil type including a floating blowout coil assembly and a pair of arc-extinguishing sections, of a transfer arc-extinguishing means and a pair of transfer arc horns, a movable contact separable from a relatively stationary contact to establish an arc, the front transfer horn farthest away from the relatively stationary contact being extended downwardly toward the contacts farther than the rear transfer arc horn.

7. A circuit interrupter including a pair of arc-extinguishing sections and a floating blowout coil assembly disposed therebetween, a movable contact separable from a relatively stationary contact to establish an arc, a pair of transfer arc horns connected to the ends of the blowout coil, and the transfer arc horn farthest from the stationary contact being extended to just mechanically clear the path of motion of the movable contact, and bent at its lower extremity toward the relatively stationary contact.

8. A circuit interrupter including a pair of contacts cooperable to establish an arc therebetween, at least one of the contacts having a pair of magnetic bars disposed in a generally V-shape adjacent the contact surface to assist arc terminal movement along said one contact, and the apex of the V pointing in the direction of movement of the arc.

9. A circuit interrupter including a pair of contacts cooperable to establish an arc therebetween, at least one of the contacts being composed of a non-magnetic material having a pair of magnetic bars disposed in a generally V-shape adjacent the contact surface to assist arc terminal movement along said one contact, and the apex of the V pointing in the direction of movement of the arc.

References Cited in the file of this patent

UNITED STATES PATENTS

| | | |
|---|---|---|
| 1,313,176 | Evans | Aug. 12, 1919 |
| 1,872,387 | Baker et al. | Aug. 16, 1932 |
| 2,180,147 | Hopp | Nov. 14, 1939 |
| 2,343,323 | Pierce | Mar. 7, 1944 |
| 2,417,683 | Harlow | Mar. 18, 1947 |
| 2,611,059 | Immel et al. | Sept. 16, 1952 |
| 2,616,007 | Dickinson et al. | Oct. 28, 1952 |
| 2,644,875 | Miller | July 7, 1953 |